July 27, 1954
C. A. COGHLAN
2,684,896
PROCESS FOR THE PRODUCTION OF CARBON
MONOXIDE AND HYDROGEN
Filed Oct. 10, 1950
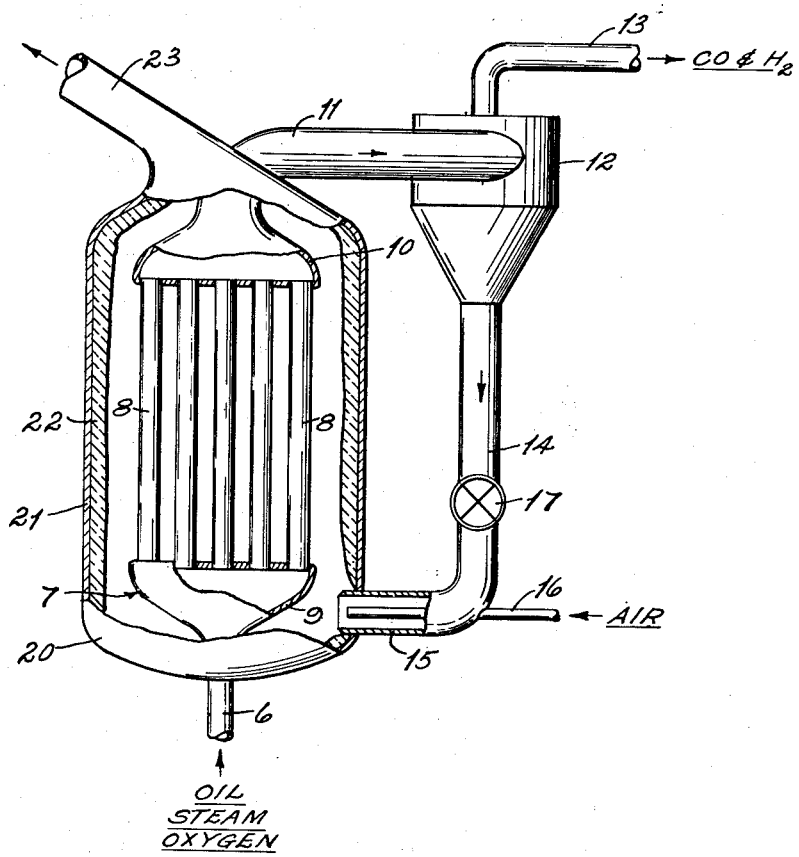
INVENTOR.
CHARLES A. COGHLAN
BY
ATTORNEYS Patented July 27, 1954

2,684,896

UNITED STATES PATENT OFFICE 2,684,896

PROCESS FOR THE PRODUCTION OF CARBON MONOXIDE AND HYDROGEN

Charles A. Coghlan, Port Arthur, Tex., assignor to The Texas Company, New York, N. Y., a corporation of Delaware Application October 10, 1950, Serial No. 189,415

3 Claims. (Cl. 48—215)

This invention relates to a process for the preparation of carbon monoxide and hydrogen by the partial oxidation of a normally liquid hydrocarbon. In one of its more specific aspects this invention relates to a process in which a liquid hydrocarbon is reacted with oxygen and steam in a primary reaction zone under conditions such that free carbon is formed in substantial quantities, the free carbon is separated from the gaseous products of combustion, burned with air in a combustion zone, and the heat resulting from the combustion of the carbon utilized as a source of heat supply to the primary reaction zone to maintain the temperature of the partial combustion reaction within the desired range.

In accordance with the present invention, a normally liquid hydrocarbon is reacted with a limited amount of steam and oxygen, substantially less than that required for carbon-free conversion of the hydrocarbon to carbon monoxide and hydrogen. This results in the liberation of a portion of the carbon in the hydrocarbon as free carbon in finely divided form. This carbon is carried from the reaction zone with the product gases. The product gases consist essentially of carbon monoxide and hydrogen. The carbon is separated from the product gas by any convenient method, e. g., by means of a Cottrell precipitator, cyclone separator, gas scrubber, or the like. The carbon is burned with air in a separate zone and the heat so generated is used to supply heat to the primary reaction zone.

The carbon monoxide and hydrogen, produced in the primary reaction zone, may be used as a feed gas for the synthesis of hydrocarbons, as a source of carbon monoxide or hydrogen for chemical processes, and the like. If hydrogen is the desired product, the carbon monoxide in the product gas may be converted to hydrogen by reaction with steam at a temperature within the range of from about 750° F. to about 900° F. The production of hydrogen by reaction of steam with carbon monoxide in the water-gas shift reaction is well known in the prior art.

Steam is preferably used in the primary reaction in admixture with the hydrocarbon oil and oxygen to produce additional quantities of hydrogen directly. In accordance with one embodiment of the present invention, hydrocarbon oil is vaporized and charged in admixture with steam and oxygen into the primary reaction zone. The reaction zone is preferably in the form of a series of elongated cylindrical heat exchange tubes such as a tube type heat exchanger with the primary reaction being conducted in the interior of the tubes. The temperature within the reaction zone is maintained within the range of from about 1,800 to about 3,200° F. and preferably within the range of from about 2,000 to 2,800° F.

The pressure at which the reaction is conducted may vary from about atmospheric pressure to a pressure of 600 pounds per square inch gauge, or higher. The higher pressures within this range tend to increase the formation of free carbon, other conditions being equal.

Preferably the liquid hydrocarbon is vaporized and preheated prior to charging to the reaction zone. Similarly, it is preferable to preheat the steam supplied to the reactor. Oxygen may be supplied with or without preheating. Preheating of the feed streams tends to reduce the oxygen requirements.

As a result of effecting substantial conversion of the hydrocarbon to solid carbon, the remainder is converted to a mixture of hydrogen and carbon monoxide having a relatively high proportion of hydrogen to carbon monoxide as compared with the product obtained under carbon-free conditions.

With reference to the drawing, the hydrocarbon fuel oil is introduced together with oxygen and steam through line 6 into the interior of generator 7. The generator 7 or primary reaction zone is designed to permit heat transfer from the exterior to the interior. As illustrated in the drawing, this may comprise a series of tubes 8 attached to an inlet header 9 and an exhaust header 10. The hydrocarbon, steam and oxygen undergo reaction within the tubes 8 while the products of combustion are discharged through the exhaust header 10 into a product line 11. Sufficient oxygen is supplied to maintain the reaction temperature above about 1,800° F. and preferably within the range of 2,000 to 2,600° F. Oxygen and steam are supplied with the fuel through line 6 in a limited amount substantially less than that required stoichiometrically to convert the hydrocarbon to carbon monoxide and hydrogen.

The product gas consisting chiefly of carbon monoxide and hydrogen and containing free carbon in suspension is passed through line 11 into a separator 12. The separator 12 may suitably be a cyclone separator in which the free carbon is separated from the product gas. The carbon-free product gas is discharged through line 13. Carbon separated from the gas descends through the pipe 14 into a burner 15 where it is mixed with air introduced through line 16. A valve 17 in the carbon feed line controls the rate of flow of carbon from the separator to the burner.

Carbon produced in the generator 7 is burned with air in a heater 20 to supply heat by indirect heat exchange to the reactants within the tubes 8. The heater comprises a shell 21 provided with a suitable refractory insulation 22. Flue gases are discharged from the system through line 23.

Various normally liquid hydrocarbons are suitable for fuels of the process. It is contemplated that the process will find application to the conversion of low market value petroleum fractions, low grade fuel oil, crude residuum, or the like, to carbon monoxide and hydrogen, which in turn are useful for the production of synthetic fuels or for chemical processes.

It will be apparent that when the carbon produced in the generator or primary reaction zone decreases, less carbon is available as fuel for the heater so that the reaction temperature tends to decrease. A decrease in temperature favors the production of additional carbon, other conditions being substantially constant. Conversely, an increase in carbon production makes more fuel available and tends to increase the reaction temperature. In this manner, the system tends to seek its own balance.

Hydrocarbon oils are relatively deficient in hydrogen, but have a high heating value due to their carbon content. The present process conserves the hydrogen content of the oil and is economical of oxygen.

The proportions of fuel, oxygen and steam are regulated so that the quantity of oxygen in the reaction mixture, as compared with the carbon content of the fuel, is less than the amount necessary for carbon-free conversion of the fuel to carbon monoxide and hydrogen. Carbon-free operation is thermodynamically possible with oxygen in an amount stoichiometrically required for conversion of the hydrocarbon to carbon monoxide and hydrogen, that is about 0.5 mol of oxygen per mol of carbon in the feed at temperatures above about 1,800° F. Thermodynamically, carbon-free operation may take place with as little as 0.45 mol of oxygen per mol of carbon at temperatures above about 2,000° F. If the pressure is on the order of 1,000 pounds per square inch gauge. Below 1,800° F., the oxygen requirements increase above 0.5 mol per mol of carbon in the feed for thermodynamically possible carbon-free operation.

In actual operations, more than the theoretical quantity of oxygen is required for carbon-free operation. It is well known, for example, that carbon troubles are often experienced in oil burning furnaces even when oxygen, from air, is supplied in excess of the quantity required for complete combustion. Similarly, it is extremely difficult to produce carbon monoxide and hydrogen from oil without the formation of some carbon. It is also known that the apparatus in which the combustion or partial combustion takes place has considerable influence on the formation of carbon. The present invention is not concerned, however, with the incidental or unavoidable formation of carbon.

In the present process, in excess of 2 per cent by weight of the carbon in the fuel is liberated as free carbon. The free carbon production may run as high as 35 weight per cent of the carbon in the fuel. Generally, it is desirable to convert from about 5 to about 25 weight per cent of the carbon in the fuel to free carbon.

The total oxygen supplied to the primary reaction zone may range from about 0.35 to about 0.65 mol per mol of carbon in the feed.

The following example illustrates a specific application of the present process.

A mixture of hydrogen and carbon monoxide is prepared by partial combustion of Los Angeles Basin residuum of 16.4° A. P. I. gravity having the following analysis:

| | Weight per cent |
|---|---|
| Carbon | 85.4 |
| Hydrogen | 11.4 |
| Oxygen | 1.0 |
| Nitrogen | 0.7 |
| Sulphur | 1.5 |

This fuel oil is charged to the primary reaction zone in which partial combustion is effected at a temperature of 2,490° F. and a pressure of 405 pounds per square inch gauge. The fuel oil is admixed with steam and oxygen of 96.3 volume per cent purity in the ratio of 1 barrel of oil to 111.5 pounds of steam and 2,272 standard cubic feet (measured at 60° F. and atmospheric pressure) of oxygen-containing gas. These three feed streams have a common preheat of 600° F. The molar ratio of oxygen to carbon in the total charge is 0.377 and the molar ratio of free oxygen to carbon is 0.242.

The carbon black produced by this operation amounts to about 71.5 pounds per barrel of oil or about 24 per cent of the carbon in the fuel. The carbon black is separated from the product gas without reduction in pressure. About 98.5 per cent of the carbon black is recovered and burned with air in the heating zone in indirect heat exchange with the primary reaction zone. Approximately 70.4 pounds of carbon black per barrel of fuel oil is burned in the heating zone with 10,810 standard cubic feet of air, the combustion being effected at 2,525° F. and 400 pounds per square inch gauge. The air to the heating zone is preheated to 950° F. by heat exchange with the product gases from both zones.

The gaseous product from the primary reaction zone, after separation of carbon, is scrubbed with water at 395 pounds per square inch gauge and 95° F. for removal of sulfur compounds and residual carbon, and condensation of water produced in the process. The gas yield amounts to 15,910 standard cubic feet (measured at 60° F. and atmospheric pressure) per barrel of oil. The hydrogen-to-carbon monoxide ratio is 1.34 as contrasted with the theoretical value of 0.8 on the basis of the composition of the fuel oil. The composition of the dry scrubbed gas is as follows:

| | Volume per cent |
|---|---|
| Hydrogen | 56.1 |
| Methane | 1.2 |
| Water | 0.2 |
| Carbon monoxide | 41.8 |
| Nitrogen | 0.7 |

Obviously many modifications and variations of the invention as above set forth may be made without departing from the spirit and scope thereof and only such limitations should be imposed as are indicated in the appended claims.

I claim:

1. In a process for the generation of synthesis gas consisting essentially of hydrogen and carbon monoxide from normally liquid hydrocarbons, the improvement which comprises subjecting said hydrocarbons to non-catalytic partial combustion in a primary reaction zone free from solid contact material at a temperature within the range of from about 1,800° F. to about 3,000° F. with oxygen in a regulated amount substantially less than that stoichiometrically required for conversion of all of the carbon contained in said hydrocarbons into carbon monoxide thereby maintaining carbon-forming conditions such that that in excess of 2 per cent by weight of the carbon in the hydrocarbons is liberated as free carbon; separating the free carbon from the hydrogen and carbon monoxide; and burning carbon so produced in a combustion zone contiguous with and in indirect heat exchange with said primary reaction zone to supply heat to said reaction zone.

2. A process as defined in claim 1 wherein the temperature in the primary reaction zone is within the range of from about 2,000° F. to about 2,800° F.

3. In a process for the generation of synthesis gas consisting essentially of hydrogen and carbon monoxide from normally liquid hydrocarbons, the improvement which comprises subjecting said hydrocarbons to reaction in a primary reaction zone free from solid contact material at a temperature within the range of from about 1,800° F. to about 3,000° F. with steam and oxygen in regulated amounts such that the total oxygen content of the reaction mixture is not more than that stoichiometrically required for conversion of all of the carbon contained in said hydrocarbons into carbon monoxide thereby maintaining carbon-forming conditions such that in excess of 2 per cent and not more than 35 per cent by weight of the carbon in said hydrocarbons is liberated as free carbon, separating the free carbon from the hydrogen and carbon monoxide, and burning carbon so produced in a second zone contiguous with and in indirect heat exchange with said reaction zone to supply heat thereto.

References Cited in the file of this patent

UNITED STATES PATENTS

| Number | Name | Date |
| --- | --- | --- |
| 1,228,818 | Pictet | June 5, 1917 |
| 1,843,063 | Burke | Jan. 26, 1932 |
| 2,346,754 | Hemminger | Apr. 18, 1944 |
| 2,425,754 | Murphree et al. | Aug. 19, 1947 |
| 2,448,290 | Atwell | Aug. 31, 1948 |
| 2,523,284 | Eastman | Sept. 26, 1950 |